United States Patent [19]
Vinci

[11] Patent Number: 4,627,385
[45] Date of Patent: Dec. 9, 1986

[54] BARK RESTRAINING DEVICE FOR DOGS

[76] Inventor: Rene Vinci, 4 Rue Raymond Bistors, Perpignan, Pyrenees Orientales, France

[21] Appl. No.: 709,433

[22] Filed: Mar. 7, 1985

[51] Int. Cl.⁴ .............................................. A01K 15/00
[52] U.S. Cl. ........................................ 119/29; 239/152
[58] Field of Search ............... 119/29, 106, 159, 160; 239/36, 152, 153, 154

[56] References Cited

U.S. PATENT DOCUMENTS

| | | | |
|---|---|---|---|
| 1,349,665 | 8/1920 | Duncombe | 119/106 |
| 3,823,691 | 7/1974 | Morgan | 119/29 |
| 4,162,764 | 7/1979 | Millsap | 239/152 |
| 4,180,013 | 12/1979 | Smith | 119/29 |
| 4,241,850 | 12/1980 | Speer | 239/154 X |

FOREIGN PATENT DOCUMENTS 1071172  8/1954  France ................. 119/106

*Primary Examiner*—Robert P. Swiatek
*Attorney, Agent, or Firm*—Remy J. VanOphem

[57] ABSTRACT

A device for use in the training of a dog, for example to dissuade the dog from barking. The device, which is carried by the collar of the dog, has a tank which carries a substance that affects the special senses of the dog, particularly the nose and the eyes. The tank has a valve which, when activated, releases a spray of the substance in the region of the head of the dog. An electronic circuit is provided to actuate the valve of the tank when desired, for example, in response to a signal from a microphone with a filter which is sensitive to the frequencies that correspond to those of the bark of the dog. The electronic circuit may also be responsive to a signal from a remote transmitter, to permit a trainer to actuate the release of the spray when desired as part of the training of the dog, and a selector switch may be provided to selectively permit the release of the spray either on command from a remote location or automatically in response to the barking of the dog. The special substance in the tank may either be in the form of a pressurized aerosol of the substance, or a pump may be provided to pressurize a normally unpressurized substance at the time of its release.

6 Claims, 7 Drawing Figures

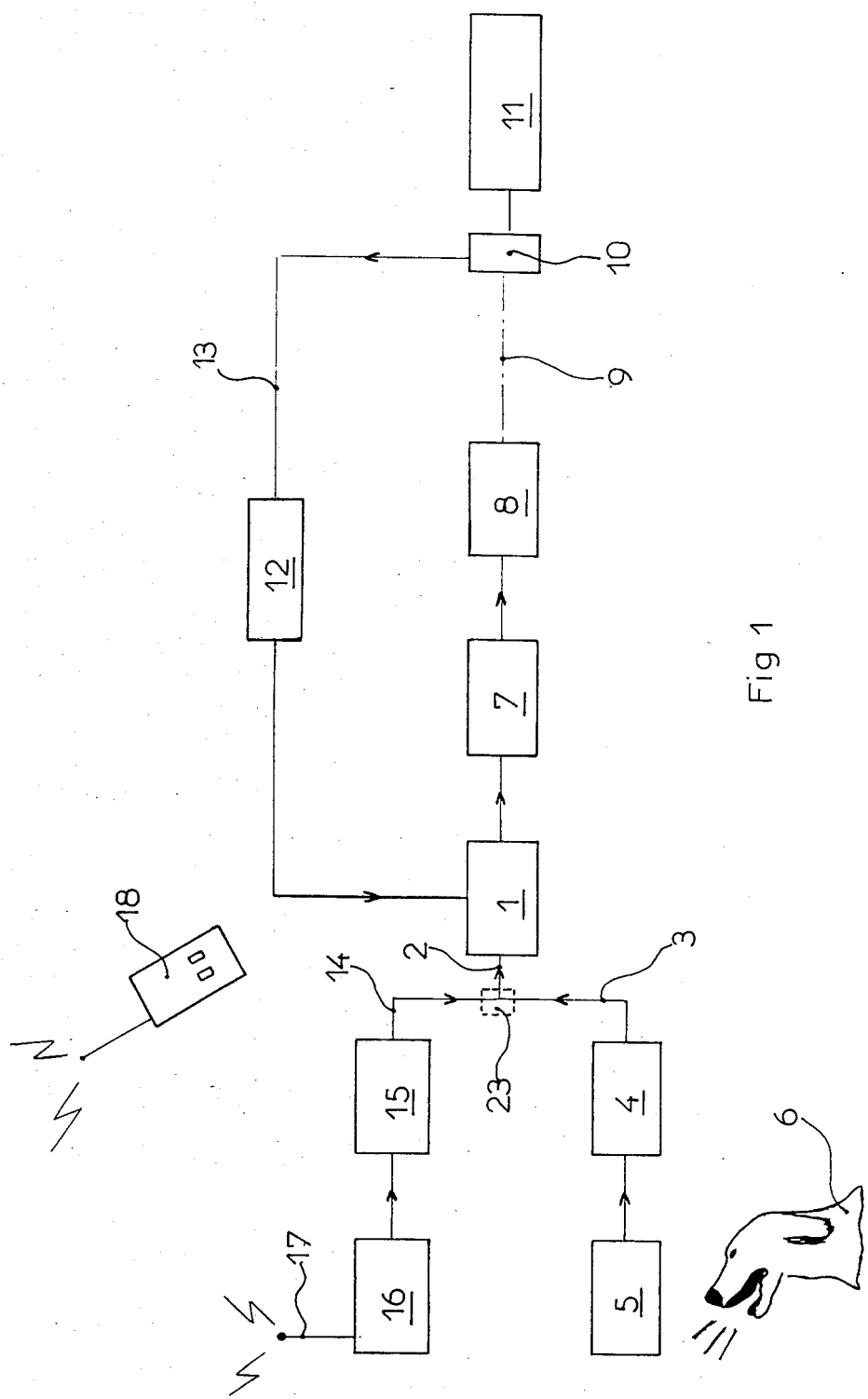

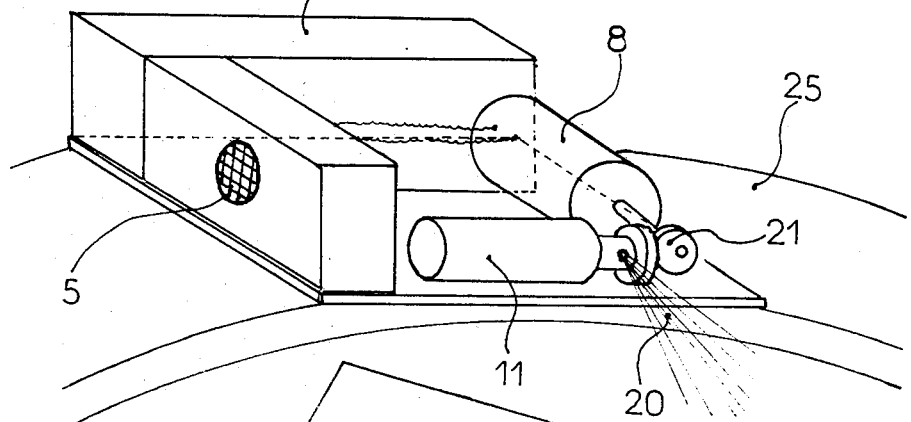
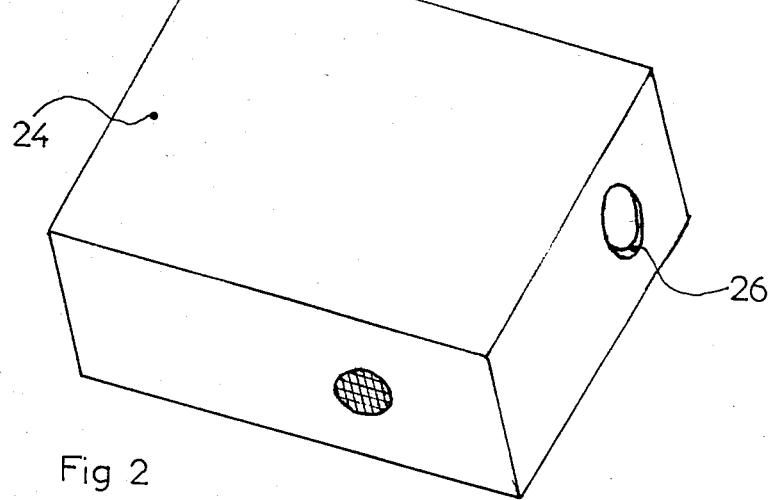

BARK RESTRAINING DEVICE FOR DOGS

BACKGROUND OF THE INVENTION

The present invention pertains to a device for training a dog to dissuade barking.

A large number of dogs now live in populated areas and, in cities, some dogs even live in apartments. The proximity of dogs to people is the source of various conflicts, particularly when the dogs bark. Whenever a dog barks for an extended period of time, whether in daytime or at night, it causes a serious disturbance to neighbors, sometimes leading to litigation. For this reason there has been an interest in developing a device to dissuade dogs from barking.

The usual devices of this type utilize means which can be cruel to the dog. In some cases, as soon as the device detects a barking sound, it transmits an ultrasonic signal which is painful when it is received by the dog. Other known devices send an electrical discharge to the dog as soon as its barking is detected.

Experience shows that these devices are not only cruel, but also ineffecive.

SUMMARY OF THE INVENTION

The present invention eliminates these drawbacks by providing a device which effectively dissuades a dog from barking and which does so by means that are gentle and even pleasant to the dog.

The device according to the present invention is carried in the collar worn by the dog, and includes an acoustic pick-up which transmits an electric signal as soon as it has detected the barking of the dog. The device according to the present invention is further characterized by the fact that it has an element that can be activated by the electric signal from the acoustic pick-up to cause the release in the atmosphere, and in the area surrounding the head of the dog, of a substance that dissuades the dog from barking.

According to another feature of the invention, the barking-dissuading substance is contained in a pressure tank that is carried by the collar, and the pressure tank is equipped with a spray valve which is activated by appropriate means as soon as the dog starts to bark.

According to another feature of the invention, the means provided to activate the spray valve of the pressure tank is a cam which is rotatably driven by an electric motor, an assembly which is also carried by the collar of the dog.

According to another embodiment of the invention, the barking-dissuading substance is in the form of an aerosol under constant pressure in the tank, and the tank has a valve lifter which is activated by a cam whenever the dog barks to release a pressurized spray of the barking-dissuading substance.

According to another embodiment of the invention, the barking-dissuading substance is contained in the tank in an unpressurized condition whenever the dog is not barking. This embodiment is an assembly which incorporates a spray pump that pressurizes the substance when the dog barks by means of a barking-actuated cam that actuates a valve lifter on the spray pump to spray the substance.

According to another feature of the invention, the device includes an electronic circuit and an electric battery.

According to another feature of the invention, the electronic circuitry incorporates the following components: a microphone which picks up the external sounds and more specifically the dog's barking sounds; a filter which is preset to let only those frequencies characteristic of the barking pass through; an amplifier; a relay; an electric motor that is used to rotatably drive a cam that operates the tank valve; and a reset stage connected between the valve and the amplifier which stops the motor as soon as the valve returns to the closed, neutral position.

According to another embodiment of the invention, the microphone is connected to the input terminal of the amplifier, in parallel with a radio receiver which can be remotely activated by a radio transmitter. In this embodiment, a selector switch is provided at the input terminal of the amplifier to selectively connect the amplifier either to the bark pick-up microphone, or to the radio receiver. Such a device may be used for dog training, to permit orders to be given to the dog from a distance. It is also contemplated that various members, other than a cam, can be utilized between the electronic circuitry and the tank, to activate the spray valve.

For a further understanding of the present invention, attention is directed to the attached drawing and the following description thereof, to the detailed description of the invention and to the appended claims.

BRIEF DESCRIPTION OF THE DRAWINGS

FIG. 1 is a diagrammatic view illustrating the electronic wiring of a device according to the preferred embodiment of the invention;

FIG. 2 is a perspective view illustrating an embodiment in the form of a miniaturized box;

FIG. 3 is a perspective view illustrating the contents of the miniaturized box of FIG. 2;

DETAILED DESCRIPTION OF THE INVENTION

Figure 4:
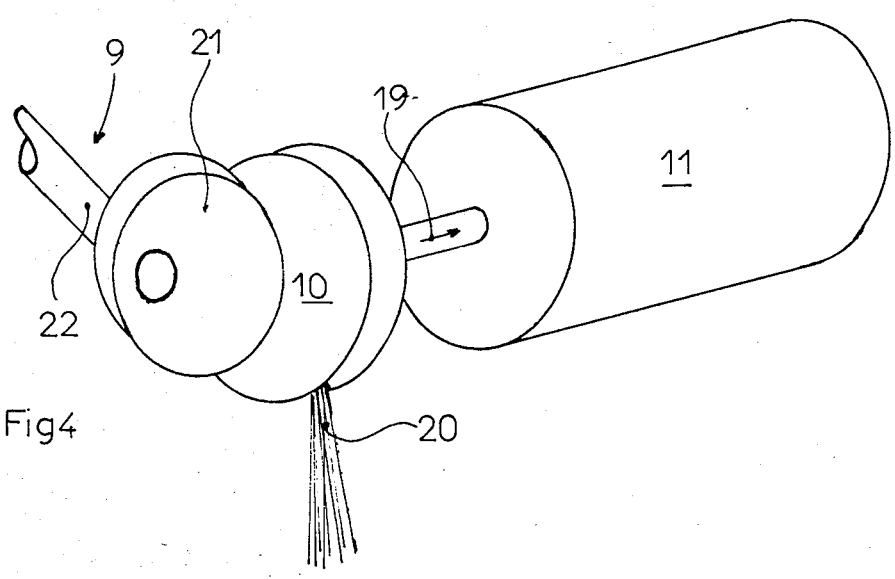
FIGS. 4 and 5 are perspective diagrammatic views which illustrate the operation of the mechanical portion of the device according to the present invention, namely the spray control interfacing with the tank valve.

The electronic diagram illustrated in FIG. 1 includes an amplifier 1 whose input terminal 2 is connected by a line 3 with a filter 4. The filter 4 receives the signals transmitted by a microphone 5. The microphone 5 detects the surrounding sounds and the filter 4 is set in such a manner as to only pass those signals which correspond with the specific frequencies of the bark of a dog 6.

The amplifier 1 activates an electric motor 8 by means of a relay 7. The electric motor 8 controls the spray valve 10 of a tank 11 through means 9, as hereinafter is described more fully. The tank 11 contains a substance that the valve 10 releases in the atmosphere in the vicinity of the special senses of the dog 6, particularly the nose and the eyes.

A reset feature 12 is provided on a line 13 that is connected between the spray valve 10 and the amplifier 1.

The line 14 may be connected to the input line 2 of the amplifier 1, in parallel with the line 3. The line 14 extends from a filter and transducer 15, and receives the signals of a radio receiver 16 equipped with a receiver antenna 17. This antenna receives the remote radio signals sent by a transmitter 18.

The tank 11 may consist of an aerosol spray can, namely one that would contain the substance to be released under continuous pressure. It may also consist of a pressureless tank, similar to an atomizer wherein the spray pump would be replaced by the valve 10. In any case, as is shown in FIG. 4, as the head of the valve 10 is pushed in the direction indicated by arrow 19, it releases a spray 20 of the substance.

Figure 5:
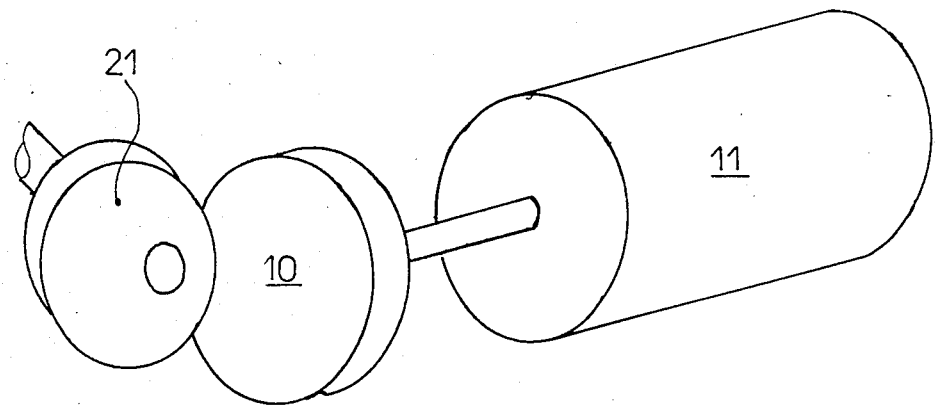
Figure 7:
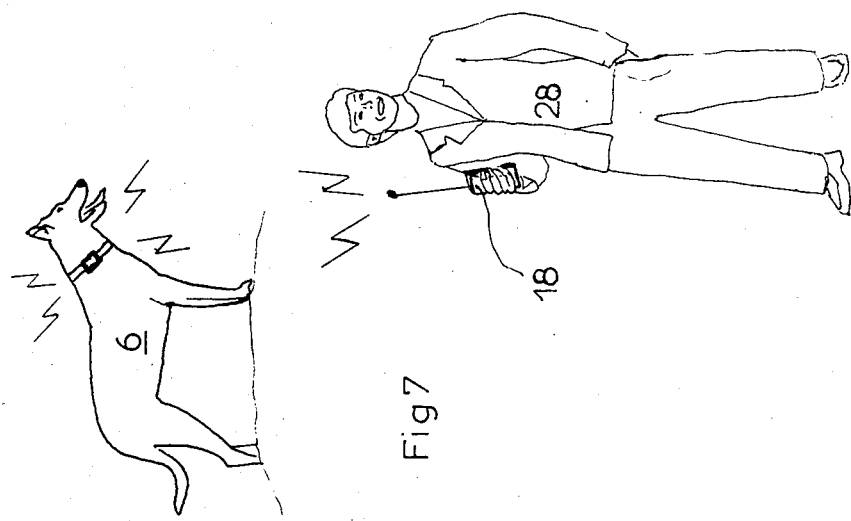
FIG. 7 is a view which shows the device used for the remote training of a dog.
Figure 6:
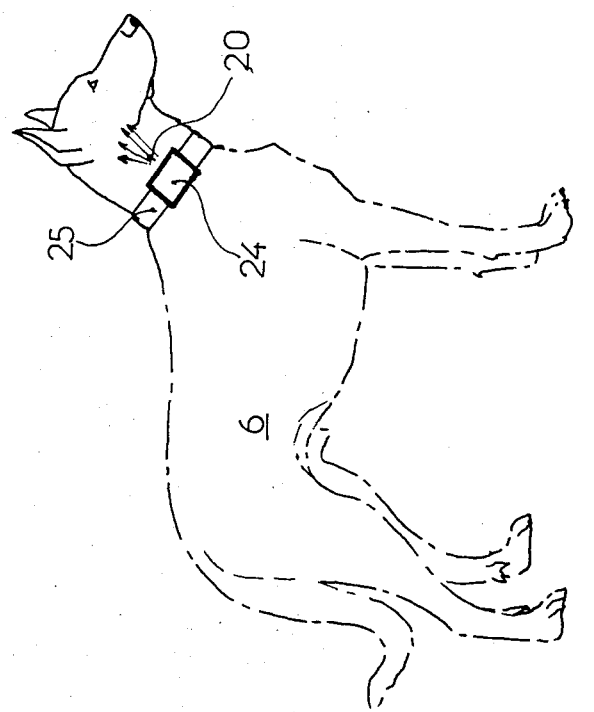
FIG. 6 is a view which shows a dog wearing the device to restrain its barking.

In the embodiment illustrated in FIGS. 4 and 5, the means 9, connecting the motor 8 with the head of the valve 10, includes an eccentric cam 21 which is driven in rotation by the motor 8 through a rotating shaft 22. As the throw of the cam 21 depresses the valve 10, as shown in FIG. 4, it releases a spray 20 of the substance contained in the tank 11. However, when the device returns to the reset position illustrated in FIG. 5, the back of the cam 21 is then in contact with the valve 10, which is in the neutral or non-dispensing position.

Finally, at the connection point between both lines 3, 14 and the input terminal 2 of amplifier 1, it would be feasible to interpose a selector switch 23 enabling the device to be activated either by the microphone 5 or by the radio receiver 16.

The assembly is mounted inside a miniaturized box 24, as shown in FIG. 2, and may be attached to the collar 25 of the dog 6. A port or nozzle 26 is provided in the box 24 to release the spray 20. The box 24 also contains a battery 27 to power the assembly.

The device operates as follows:

When the dog 6 wears a collar 25 equipped with the box 24, each activation of the motor 8 causes the spray 20 of a special substance toward the special senses of the dog, particularly the nose and the eyes.

If the device is set to be activated by the impulses coming from the microphone 5, it can be operated in two ways.

First, if the microphone 5 and the filter 4 are set to be activated by the barking of the dog 6, as illustrated in FIG. 1, a spray 20 of a special substance will be directed toward the head of the dog 6 whenever it barks. This dissuades the dog from barking.

Alternatively, if the microphone 5 and its filter 4 are set to be activated by certain tones in the voice of a training instructor at a distance, the dog 6 will receive a spray 20 of the special substance every time it is requested by the voice of the instructor. In this manner, the device can be used to assist in the training of the dog 6.

According to another embodiment of the invention, when the switch 23 is set in the position connecting the amplifier 1 with the radio receiver 16, the device may be used for the training of the dog 6. In this embodiment, the transmitter 18 is carried by the training instructor 28 who is engaged in the training of the dog 6. In the course of the instruction, the training instructor 28 can, therefore, use the spray 20 of the special substance whenever necessary to control the response of the dog 6 to his orders.

The replacement of the rotary cam 21 by any equivalent device that would provide the means 9 necessary to activate the spray valve 10 would still fall within the contemplation of the invention. In particular, the means 9 could consist of an electromagnet, or of a spring kept under tension by the motor 8 so as to store enough power to press on the head of the valve 10 upon request.

It will be appreciated by those skilled in the art that various modifications of the device described above are within the scope of the invention as defined by the claims appended hereto.

What is claimed is:

1. A device for dissuading a dog from barking and adapted to be carried by a collar worn by the dog around its neck, said device comprising:

sound sensing means sensitive to sound frequencies characteristic of the frequency of the bark of the dog, said sound sensing means further being adapted to emit an electrical signal when actuated by the bark of the dog; and means responsive to said electrical signal and carrying a substance which is adapted to dissuade the dog from barking, said means further being adapted to discharge a portion of said substance in the region of the head of the dog in response to said electrical signal, said means responsive to said electrical signal comprising a tank, said substance carried by said means responsive to said electrical signal being carried within said tank in a pressurized condition, said means responsive to said electrical signal further comprising a spray valve operatively associated with said tank, said spray valve further being activatable by said electrical signal to release said substance from said tank and to discharge said substance in a spray through said spray valve.

2. The device according to claim 1 wherein said means responsive to said electrical signal further comprises:

an electric motor; and a cam rotatably driven by said electric motor, said electric motor and said cam being adapted to be carried by said collar as part of said device.

3. The device according to claim 2 wherein said means responsive to said electrical signal further comprises an electric battery and electronic means for receiving said electrical signal.

4. The device according to claim 3 wherein said electronic means comprises reset means for resetting said device after discharging said portion of said substance.

5. The device according to claim 1 wherein said means responsive to said electrical signal further comprises an electric battery and electronic means for receiving said electrical signal.

6. The device according to claim 5 wherein said electronic means comprises reset means for resetting said device after discharging said portion of said substance.

* * * * *